Sept. 22, 1953
M. H. ROWE
THEATER SEAT
2,652,881
Filed May 4, 1950
3 Sheets—Sheet 1
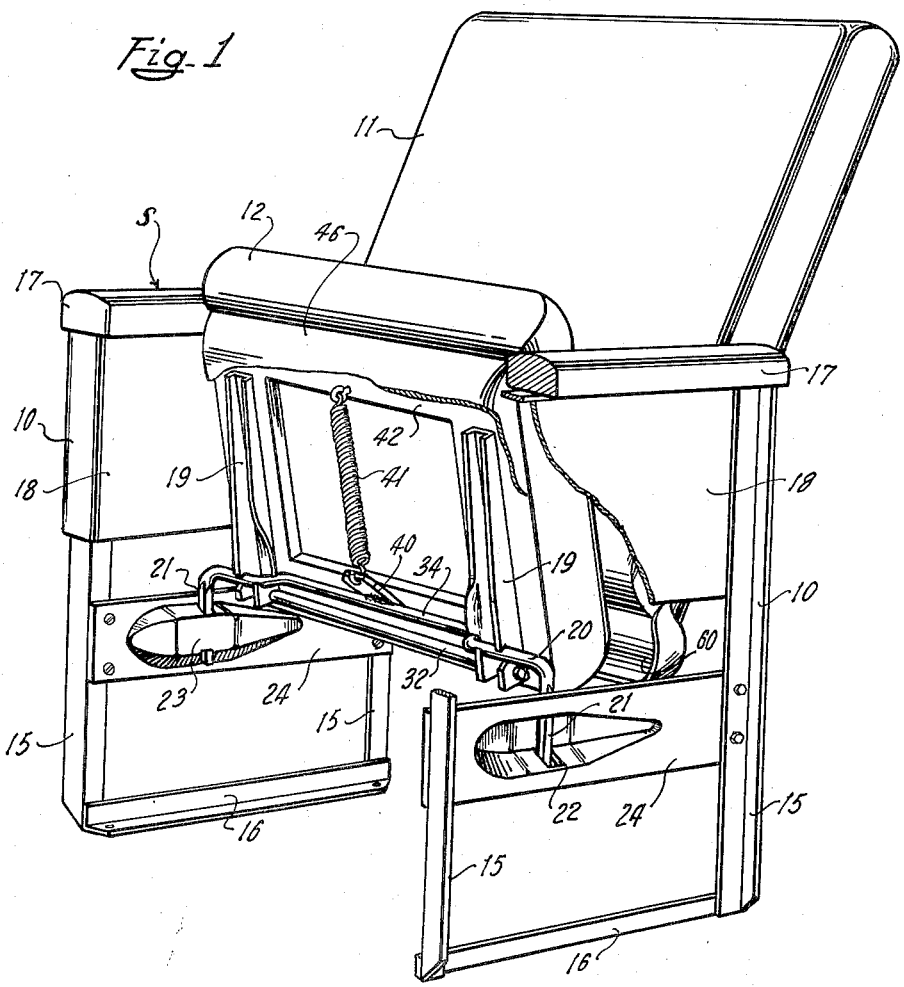
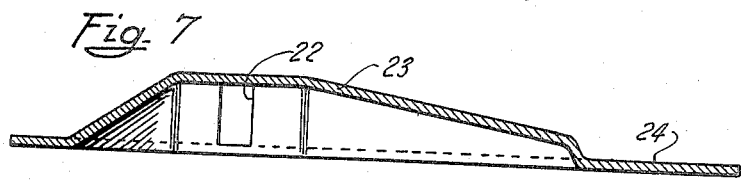
Marion H. Rowe
INVENTOR.
BY
ATTORNEY Sept. 22, 1953      M. H. ROWE      2,652,881
THEATER SEAT
Filed May 4, 1950      3 Sheets-Sheet 2
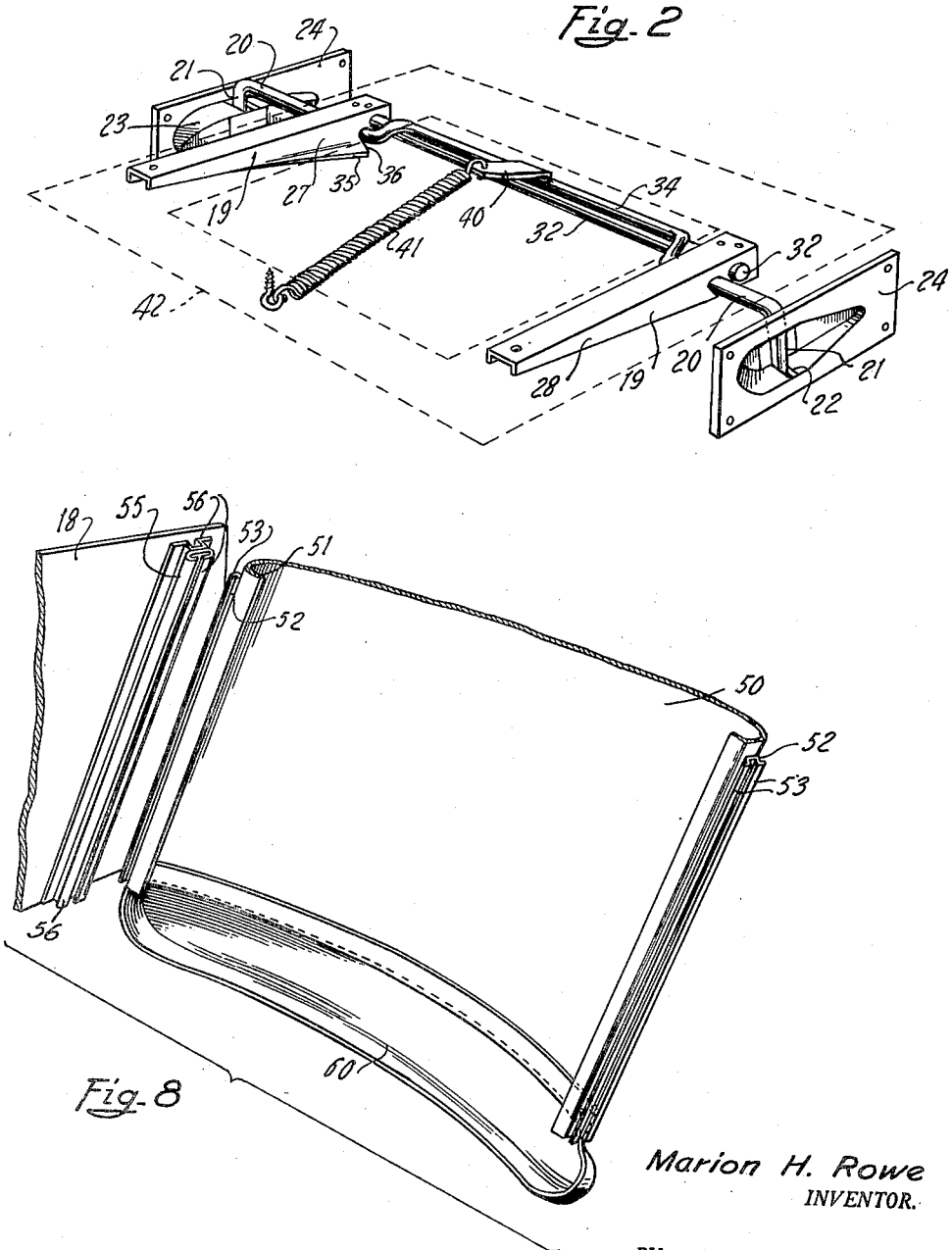
Marion H. Rowe
INVENTOR.
BY *[signature]*
ATTORNEY

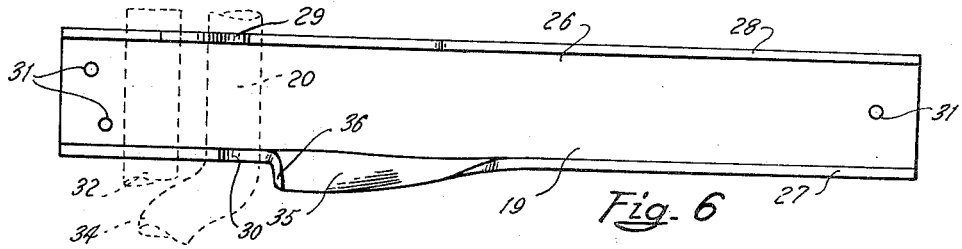
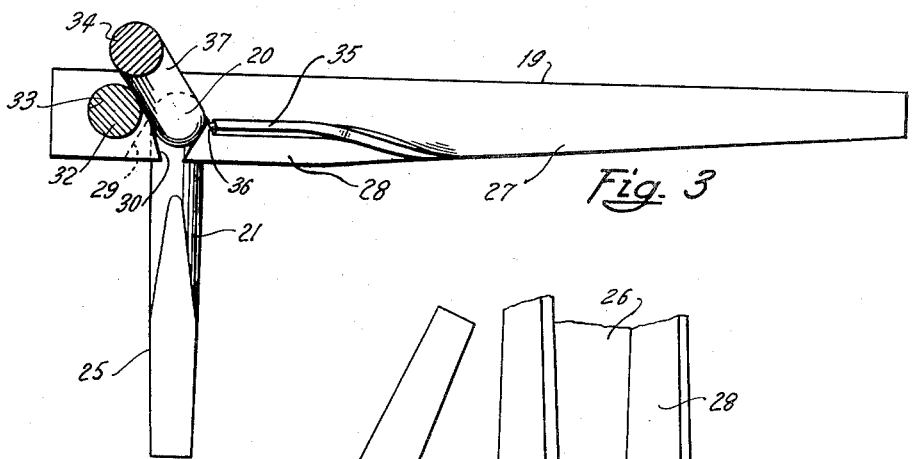
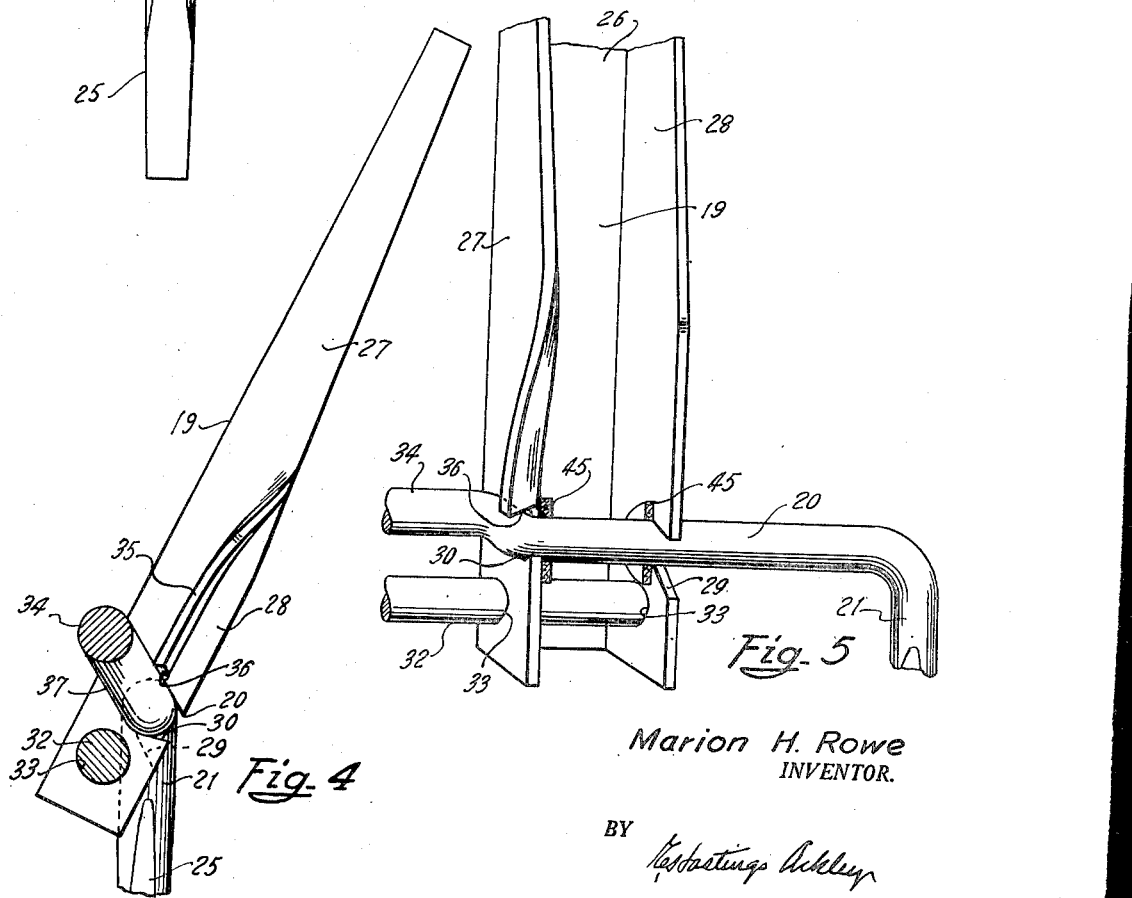

Patented Sept. 22, 1953

2,652,881

UNITED STATES PATENT OFFICE 2,652,881

THEATER SEAT

Marion H. Rowe, Dallas, Tex., assignor to American Desk Manufacturing Co., Temple, Tex., a corporation of Texas Application May 4, 1950, Serial No. 159,921

10 Claims. (Cl. 155—85)

This invention relates to new and useful improvements in theater seats.

One object of the invention is to provide a theater seat having an improved and simplified structure.

An important object of the invention is to provide in a theater seat a mounting for a tiltable seat member which is particularly simple in structure and economical to manufacture and install, and which is provided with stop means for positively stopping the seat in raised or lowered position, and having also incorporated therein resilient means for normally maintaining the seat in a retracted partially raised position.

A particular object of the invention is to provide in a theater seat an improved hinge mechanism for the tilting seat member having improved stop means for positioning the seat member in lowered occupant-supporting position.

Another object of the invention is to provide in a seat hinge of the character described simplified stop means for limiting the movement of the seat to a raised position.

It is still another object of the invention to provide a theater seat hinge, of the character described, which is adapted to be manufactured and shipped "knocked-down" or in unassembled condition, and which is particularly adapted for easy assembly and erection at the point of installation; such characteristics also providing for ease and simplicity of repair or servicing of the hinge and seat.

A further object of the invention is to provide a seat hinge of the character described which is adapted to mounting a plurality of seats in a row disposed in a curved form, such as the arc of a circle or otherwise, and which is also adapted to permit variations in the width of the space between the arm supports of the seat, if desired.

A still further object of the invention is to provide, in a theater seat hinge mechanism of the character described, an improved simplified spring mechanism for normally automatically swinging the seat member to a partially raised position to permit persons to pass the seat without interference by the seat member.

Another object of the invention is to provide in a theater seat an improved hinge structure of the character described wherein the moving parts are enclosed to prevent injury to the occupant or damage to his clothing.

A further important object of the invention is to provide a theater seat hinge construction which is very economical to produce, and wherein substantially all parts of the hinge are readily formed by stamping, pressing, or the like, and the assembly of the parts is extremely simple, easy and economical.

Still another object of the invention is to provide a novel mounting for the inclined back rest portion of the seat.

Additional objects and advantages of the invention will readily be apparent from the reading of the following description of a device constructed in accordance with the invention, and reference to the accompanying drawings thereof, wherein:

Figure 1 is a perspective view, partly in elevation and partly in section, of a theater seat constructed in accordance with the invention, Figure 2 is an enlarged isometric view of the seat hinge mechanism, Figure 3 is an enlarged view, partly in elevation and partly in section, of the hinge shaft and one of the hinge members mounted thereon, Figure 4 is a view similar to Figure 3 and showing the hinge member in an elevated position, Figure 5 is an enlarged perspective view of the hinge shaft and hinge member, showing the hinge member in raised position, Figure 6 is an enlarged underside plan view of one of the hinge members, Figure 7 is an enlarged longitudinal sectional view of one of the hinge bar supporting brackets, and Figure 8 is an enlarged fragmentary perspective view of the seat back mounting.

In the drawings, the letter S designates generally a theater seat constructed in accordance with the invention, and which may be a single seat or one of a number of adjacent seats arranged in a row in the customary manner in a theater or auditorium. The seat comprises generally a pair of spaced upright standards 10 which carry a stationary back rest member 11 and a tiltable or folding seat member 12 therebetween. The upright standards 10 may be common to two adjacent seats, in the usual or well-known conventional manner, so that only one standard is used between two adjacent seat members and back members.

The standards each include a pair of upright angle members 15 which are connected at their lower ends to an angle floor member 16 by means of which the standards may be connected to the floor of the theater. Arm rests 17 are mounted on the upper ends of the upright angles and the usual separator plate 18 is secured between the upright angles below the arm rests for enclosing the sides of the seat. While the upright members 15 are described as being angle members, it is believed obvious that they may be channel members or any other desired suitable shape, as may the floor member 16.

The seat member 12 is pivotally mounted by means of a pair of hinge members 19 on a transverse hinge rod or shaft 20 having a downturned arm 21 at each end, and the arms fit in rectangular openings or slots 22 in an inwardly extending flange or boss 23 formed on a hanger bracket 24 carried by each upright standard. The hanger bracket is illustrated as being formed of a metal plate having the dished or hollow boss or flange 23 formed thereon by die pressing or the like, though the bracket may be made of solid metal having the flange or boss cast or otherwise formed thereon and provided with the vertical slots 22 for receiving the hinge shaft arms.

The arms of the hinge shaft are provided with opposed flattened surfaces 25 which taper inwardly toward the lower end of the arms so that the tapered ends will fit and wedge in the rectangular slots 22 formed in the boss of the hinge shaft brackets. This wedge fit holds the hinge shaft against displacement from the brackets. Since the openings or slots 22 are greater in length than the thickness of the arms of the hinge shaft, it will be seen that the upright standards 10 may be adjusted laterally inwardly or outwardly to vary the width of the seat and to provide for mounting the seats in the usual curved position in the auditorium. Thus, the upright standards may be fixed at desired positions on the floor of the auditorium, and the arms 21 of the hinge shafts may then be fitted in the slots in the brackets. The length and width of the slot is ample to provide for the usual ranges of curvature of the row of chairs and to permit some variation in the width of the space provided for the seats between the standards.

The hinge members 19 are preferably formed in substantially the shape of a channel having a web portion 26 and having an inner flange 27 and an outer flange 28. A slot 29 is formed in the outer flange and a slot 30 is formed in the inner flange of the hinge member, and these slots are adapted to receive the hinge shaft whereby the hinge members are removably pivotally positioned on the hinge shaft. It will be noted that the slot 29 in the outer flange preferably extends rearwardly from the shaft at an angle of approximately 30 degrees from the perpendicular to the web 26 of the hinge member, while the slot 30 in the inner flange preferably extends forwardly from the hinge shaft at an angle of approximately 15 degrees from the perpendicular to the web of the hinge member. Since these slots in the opposite flanges of the hinge member channel are disposed at angles with respect to each other, it will be seen that the hinge member may be fitted onto the hinge shaft by first positioning the slot 29 on the hinge shaft and then turning the hinge member until the other slot 30 may be fitted onto the shaft. The hinge is thus positively held in place on the hinge 10, since the offset or angularly disposed slots in effect overlap and close the bottom portion of the openings through which the hinge shaft extends. The hinge members are secured to the underside of the seat member 12 by screws extending through holes 31 formed in the web of the hinge member.

A cross bar and stop member 32 has its ends pressed into openings 33 provided in the flanges of each hinge member at a point spaced rearwardly from the slots which receive the hinge shaft, as clearly shown in Figures 3 through 6. The cross bar and stop member thus connects the rear ends of the hinge members to positively hold the hinge members in parallel relationship on the hinge shaft and to prevent twisting of the hinge members, so that they cannot slide off the hinge shaft.

The hinge shaft 20 is provided with an offset crank-like central portion 34 which is disposed between the hinge members 19 and extends upwardly and rearwardly, as best shown in Figures 3, 4 and 5. This offset central portion of the hinge shaft is so disposed that it will be engaged by the cross bar and stop member 32 when the hinge member 19 is swung to a horizontal supporting position, as shown in Figures 2 and 3. Thus, the offset crank-like central portion 34 of the hinge shaft serves as a stop engageable by the cross bar and stop member 32 to positively position the hinge member and the seat 12 carried thereby in proper supporting position.

The seat member and the hinge members 19 may, however, be swung upwardly in the opposite direction to permit retracting the seat members to the position shown in Figure 1. For limiting upward movement of the seat member, the inner flange 27 of each hinge member is provided with a laterally directed wing 35 formed by bending the portion of the inner flange forwardly of and adjacent the slot 30 outwardly at substantially right angles to the remainder of the flange. This laterally directed wing 35 is so disposed that its end face portion 36, adjacent the slot 30, will strike against the crank arm 37 of the offset crank-like central portion of the hinge shaft to stop upward movement of the hinge and the seat carried thereby. Thus, the swinging movement of the hinge members 19 on the hinge shaft 20 is limited in one direction by engagement of the cross bar or stop member 32 with the crank-like central portion of the hinge shaft, and in the opposite direction by engagement of the end faces 36 of the wings on the flanges of the hinge members with said crank-like portion of the hinge shaft.

It is preferable, when the seat is not in use, that the seat member 12 be resiliently restrained in substantially retracted or folded position, as shown in Figure 1. For so resiliently restraining the seat member in retracted position, a plate 40 is fixed by welding or otherwise to the central portion of the offset crank-like portion of the hinge shaft, and projects forwardly and upwardly therefrom, so that the outer end of the plate is above and slightly forwardly of the horizontal portions of the hinge shaft on which the hinge members are pivotally mounted. A helical coil spring 41 is connected at one end to the forward or upper end of the plate 40 and at its other end to the frame 42 of the seat member near the outer end thereof, as shown in Figures 1 and 2. When so connected, the spring is under tension, and constantly exerts its force to urge the seat member 12 toward retracted position.

Since the upper or forward end of the plate 40 is disposed above the horizontal portion of the hinge shaft 20, it will be seen that the spring will tend to lift the seat member toward retracted position when the weight of the occupant is removed from the seat. Also, since the point of connection of the spring to the forward end of the plate 40 is positioned forwardly of and above the horizontal portions of the hinge shaft 20 on which the hinge members are pivoted, it will be seen that the spring will normally resiliently restrain the seat member in a partly retracted position, in which the hinge members are in substantially the inclined position shown in Figure 4. The occupant of the seat may therefore readily swing the seat down to supporting position merely by applying his weight to the outer end portion of the seat member, since the hinges are not on dead center or disposed vertically on the hinge shaft. The seat will readily swing forward and downward to supporting position, being stopped in said position by the cross bar and stop member 32 engaging the crank arms 37 of the offset portion 34 of the hinge shaft.

If desired, oil felts 45 may be positioned on the hinge shaft 20 adjacent the inner sides of the flanges 27 and 28 of the hinge members. The oil felts will absorb and retain oil or other lubricant for lubricating the hinge members in their swinging movement on the shaft. Also, the felts will tend to reduce noises as the hinge members swing on the shaft.

A sheet metal pan or cover 46 may be secured to the underside of the frame 42 of the seat member to enclose and cover the hinge mechanism and the spring and spring plate, so that all working parts of the hinge are enclosed and protected by such pan or cover. The hinge shaft 20 will extend outwardly through openings provided in the sides of the pan in the usual manner.

The back rest member 11 is provided with a back frame 50 having its side edges turned in to form channels 51 on each side. Secured to the outer web portion of the channels are longitudinally extending substantially U-shaped fastening members 52 having lateral flanges 53 on each side. The flanges of the fastening member are adapted to fit in a grooved receiving member 55 having inturned retaining flanges 56 which receive and hold the outturned flanges 53 of the fastening member. The receiving members are secured to the separator plate 18 carried by the upright standards at each side of each seat and are disposed at an upwardly and rearwardly inclined angle. The back rest frame 50 may thus be readily connected in place between the upright standards by sliding the flanged fastening members 52 downwardly in the receiving channels 55, whereupon the back rest member is held in place between the upright standards.

A depending skirt having a concavo-convex lower edge 60 is carried at the lower end of the back rest frame 50 and is adapted to cover the rear portion of the seat member 12 to prevent injury to the feet or clothing of persons behind the seat when the seat member 12 is tilted from retracted position to supporting position and vice versa.

Obviously, the entire theater seat may be packed in "knocked-down" or unassembled condition for shipment to the point of use, and may be readily and simply installed and erected at the point of use. The upright standards having the hanger bracket secured thereto may be fixed to the floor of the auditorium, and may be positioned in a curved row in the usual or well-known manner. The back rest members may then be fixed in place between the upright standards by sliding the flanged fastening member 52 into the grooved receiving channels 55. Then, the seat member 12 may be secured in place by sliding the arms 21 of the hinge shaft into the rectangular slots 22 provided therefor in the bosses or flanges 23 of the hanger bracket. The seat is then ready for use.

Also, the entire seat member and hinge shaft may be removed from the hanger brackets and replaced with another seat member and hinge shaft. The simple construction of the hinge shaft and hinge members permits ready repair by untrained mechanics, due to the few parts and the simplicity with which the parts may be assembled and disassembled.

It will particularly be noted that the seat is provided with an improved hinge structure which is simple and economical to manufacture and install, and which is provided with improved stop means positively positioning the seat member in raised or lowered position. It will also be seen that an improved and simplified resilient restraining means has been provided in the seat for normally maintaining the seat in a retracted partially raised position to permit easy access to seats, and which will permit the seat to be readily turned down to supporting position. Furthermore, the hinge construction is economical to produce, since substantially all parts of the hinge structure may be readily formed by stamping, pressing or the like, whereby the cost of manufacture and assembly is reduced.

It will likewise be seen that the seat has been provided with a novel mounting for the inclined back rest member of the seat which permits the back rest member to be readily assembled in place on and disassembled from the upright side arm standards of the seat.

The foregoing description of the invention is explanatory only, and changes in the details of the construction illustrated may be made by those skilled in the art, within the scope of the appended claims, without departing from the spirit of the invention.

What I claim and desire to secure by Letters Patent is:

1. A chair including, spaced upright standards, a hinge shaft mounted on said standards and extending horizontally therebetween, spaced hinge members pivotally mounted on said hinge shaft, and a cross bar connecting the hinge members and spaced from said hinge shaft, said hinge shaft formed to provide stop means between the hinge members engageable by the cross bar to limit pivotal movement of the hinge members on the shaft in one direction.

2. A chair including, spaced upright standards, a hinge shaft mounted on said standards and extending horizontally therebetween, spaced hinge members pivotally mounted on said hinge shaft, and a cross bar connecting the hinge members and spaced from the hinge shaft whereby the hinge members move together, said hinge shaft formed to provide stop means between the hinge members projecting to engage the cross bar to limit pivotal movement of the hinge members on the shaft in one direction, and stop members on the hinge members projecting laterally inward to engage the stop means on the shaft for limiting pivotal movement of the hinge members on the shaft in the opposite direction.

3. A chair including: spaced upright standards; a hinge shaft mounted on said standards and extending horizontally therebetween, said hinge shaft having a pair of axially aligned horizontally spaced end portions and a stop means disposed between said end portions; a hinge member pivotally mounted on each of said end portions; and a cross bar connecting the hinge members and spaced from said end portions; said stop means being engageable by the cross bar to limit pivotal movement of the hinge members on the shaft in one direction.

4. A chair including: spaced upright standards; a hinge shaft mounted on said standards and extending horizontally therebetween, said hinge shaft having a pair of axially aligned horizontally spaced end portions and a stop means disposed between said end portion; a hinge member pivotally mounted on each of said end portions; a cross bar connecting the hinge members and spaced from said end portions; said stop means being engageable by the cross bar to limit pivotal movement of the hinge members on the shaft in one direction, and stop members projecting laterally inwardly on the hinge members to engage the stop means for limiting pivotal movement of the hinge members on the shaft in the opposite direction.

5. A chair including, spaced upright standards, a hinge shaft mounted on said standards and extending horizontally therebetween, a pair of spaced hinge members pivotally mounted on said hinge shaft, a seat member carried by said hinge members, a cross bar connecting the hinge members and spaced from said hinge shaft, said hinge shaft formed to provide stop means between the hinge members projecting to engage the cross bar to limit pivotal movement of the hinge members on the shaft in one direction to stop the hinge members in position for supporting the seat member in lowered supporting position, and an elongate tension spring connected at one end to the outer portion of the seat and connected at its other end with means on the hinge shaft at a point spaced above said hinge shaft whereby the spring biases the seat toward retracted position.

6. A hinge structure for turnably mounting a seat member on a chair and including, a hinge shaft having means at each end for connection with spaced upright standards of a chair and adapted to extend horizontally between said standards, a pair of elongate spaced hinge members each pivotally mounted adjacent one end on said hinge shaft, and a cross bar connecting the short ends of the hinge members and spaced from said hinge shaft, said hinge shaft having a crank-like off-set formed in the central portion of the shaft between the hinge members and projecting to engage the cross bar to limit pivotal movement of the hinge members on the shaft in one direction.

7. A hinge structure for turnably mounting a seat member on a chair and including, a hinge shaft having means at each end for connection with spaced upright standards of a chair and adapted to extend horizontally between said standards, a pair of elongate spaced hinge members each pivotally mounted adjacent one end on said hinge shaft, a cross bar connecting the short ends of the hinge members and spaced from said hinge shaft, said hinge shaft having a crank-like off-set formed in the central portion of the shaft between the hinge members and projecting to engage the cross bar to limit pivotal movement of the hinge members on the shaft in one direction, and stop members on the hinge members projecting laterally inwardly therefrom to engage the off-set crank-like portion of the hinge shaft for limiting pivotal movement of the hinge members on the shaft in the opposite direction.

8. A hinge structure for turnably mounting a seat member on a chair and including, a hinge shaft having means at each end for connection with spaced upright standards of a chair and adapted to extend horizontally between said standards, a pair of elongate spaced hinge members each pivotally mounted adjacent one end on said hinge shaft, a cross bar connecting the short ends of the hinge members and spaced from said hinge shaft, said hinge shaft having a crank-like off-set formed in the central portion of the shaft between the hinge members and projecting to engage the cross bar to limit pivotal movement of the hinge members on the shaft in one direction, stop members on the hinge members projecting laterally inwardly therefrom to engage the off-set crank-like portion of the hinge shaft for limiting pivotal movement of the hinge members on the shaft in the opposite direction, a plate fixed to the off-set central portion of the hinge shaft and projecting outwardly and upwardly therefrom, and a tension spring connected at one end to the outer end of said plate and adapted to have its other end connected to a seat member carried by the hinge members normally resiliently restraining the seat member and hinge members in a retracted position.

9. A hinge structure for turnably mounting a seat member on a chair and including, a hinge shaft having means at each end for connection with spaced upright side standards of a chair and adapted to extend horizontally therebetween, a pair of elongate channel-shaped hinge members each having slot openings in its flanges adjacent one end of said member receiving the hinge shaft whereby said hinge members are pivotally mounted on the shaft, the slot opening in each flange being open at the edge of the flange and extending inwardly at an angle toward the web of the hinge member, the slot openings in opposite flanges of each hinge member being disposed at an acute angle with respect to each other and terminating at their inner ends in axial alignment transversely of the hinge member, and a cross bar spaced from the hinge shaft connecting the short ends of the hinge members for holding said hinge members in parallel relationship with each other, said hinge shaft formed to provide stop means between the hinge members engageable by the cross bar to limit pivotal movement of the hinge members on the shaft in one direction.

10. A hinge structure for turnably mounting a seat member on a chair and including, a hinge shaft having means at each end for connection with spaced upright side standards of a chair and adapted to extend horizontally therebetween, a pair of elongate channel-shaped hinge members each having slot openings in its flanges adjacent one end of said member receiving the hinge shaft whereby said hinge members are pivotally mounted on the shaft, the slot opening in each flange being open at the edge of the flange and extending inwardly at an angle toward the web of the hinge member, the slot openings in opposite flanges of each hinge member being disposed at an acute angle with respect to each other and terminating at their inner ends in axial alignment transversely of the hinge member, a cross bar spaced from the hinge shaft connecting the short ends of the hinge members for holding said hinge members in parallel relationship with each other, said hinge shaft formed to provide stop means between the hinge members in the form of a crank-like off-set formed in the central portion of the shaft between the hinge members and projecting upwardly and rearwardly to engage the cross bar to limit pivotal movement of the hinge members on the shaft in one direction, the inner flange of each hinge member being formed with a laterally projecting stop wing having an end face adjacent the slot in said flange disposed to engage the off-set crank-like portion of the hinge shaft for limiting pivotal movement of the hinge members on the shaft in the opposite direction.

MARION H. ROWE.

References Cited in the file of this patent

UNITED STATES PATENTS

| Number | Name | Date |
|---|---|---|
| 787,337 | Lazarus | Apr. 11, 1905 |
| 2,081,791 | Bromagem | May 25, 1937 |
| 2,136,058 | Peppas | Nov. 8, 1938 |
| 2,529,726 | Dorton | Nov. 14, 1950 |

FOREIGN PATENTS

| Number | Country | Date |
|---|---|---|
| 676,559 | France | Feb. 25, 1930 |